(12) United States Patent
Daly et al.

(10) Patent No.: US 11,493,154 B2
(45) Date of Patent: Nov. 8, 2022

(54) THREADED CONNECTION INCLUDING AN INTERMEDIATE SHOULDER

(71) Applicants: VALLOUREC OIL AND GAS FRANCE, Aulnoye-Aymeries (FR); NIPPON STEEL CORPORATION, Tokyo (JP)

(72) Inventors: Daly Daly, Houston, TX (US); Alan Ford Fothergill, Houston, TX (US); Sebastien Roger Claude Villert, Houston, TX (US)

(73) Assignees: VALLOUREC OIL AND GAS FRANCE, Aulnoye-Aymeries (FR); NIPPON STEEL CORPORATION, Tokyo (JP)

( * ) Notice: Subject to any disclaimer, the term of this patent is extended or adjusted under 35 U.S.C. 154(b) by 346 days.

(21) Appl. No.: 14/967,111

(22) Filed: Dec. 11, 2015

(65) Prior Publication Data

US 2017/0167641 A1    Jun. 15, 2017

(51) Int. Cl.
*F16L 15/00* (2006.01)
*E21B 17/042* (2006.01)

(52) U.S. Cl.
CPC ........ *F16L 15/002* (2013.01); *E21B 17/0423* (2013.01)

(58) Field of Classification Search
CPC ..................................................... F16L 15/002
(Continued)

(56) References Cited

U.S. PATENT DOCUMENTS 4,570,982 A    2/1986   Blose et al.
5,687,999 A    11/1997  Lancry et al.
(Continued)

FOREIGN PATENT DOCUMENTS

CN    1317078 A    10/2001
CN    1639496 A    7/2005
(Continued)

OTHER PUBLICATIONS

Search Report dated Apr. 12. 2017 in PCT/EP2016/079743.
(Continued)

*Primary Examiner* — Matthew Troutman
*Assistant Examiner* — Fannie C Kee
(74) *Attorney, Agent, or Firm* — Oblon, McClelland, Maier & Neustadt, L.L.P.

(57) ABSTRACT

A threaded tubular connection comprises a first tubular component and a second tubular component. The first tubular component includes a female portion defined on an interior surface of the first tubular component. The female portion includes an inner threaded portion and an outer threaded portion which are offset radially with respect to a longitudinal axis of the first tubular component by a first shoulder. The second tubular component includes a male portion defined on an exterior surface of the second tubular component. The male portion is to be inserted into the female portion, and includes an inner threaded portion and an outer threaded portion which are offset radially with respect to a longitudinal axis of the second tubular component by a second shoulder. The second shoulder is to abut the first shoulder once the male portion is connected to the female portion.

13 Claims, 7 Drawing Sheets

(58) Field of Classification Search
USPC .................................................. 285/333–334
See application file for complete search history.

(56) References Cited

U.S. PATENT DOCUMENTS

| | | | |
|---|---|---|---|
| 6,481,760 | B1 | 11/2002 | Noel et al. |
| 2004/0262919 | A1 | 12/2004 | Dutilleul et al. |
| 2006/0261595 | A1* | 11/2006 | Verger .................. F16L 15/004 285/334 |
| 2014/0084582 | A1 | 3/2014 | Elder et al. |

FOREIGN PATENT DOCUMENTS

| | | | |
|---|---|---|---|
| CN | 104812989 | A | 7/2015 |
| EP | 0 767 335 | A1 | 4/1997 |
| JP | 10-96486 | A | 4/1998 |
| JP | 2004-504563 | A | 2/2004 |
| JP | 2011-501075 | A | 1/2011 |
| JP | 2013-536339 | A | 9/2013 |
| JP | 2014-519583 | A | 8/2014 |
| JP | 2015-534614 | A | 12/2015 |
| WO | WO 0014442 | A1 | 3/2000 |
| WO | 02/06715 | A1 | 1/2002 |
| WO | 2009/060729 | A1 | 5/2009 |
| WO | 2012/025461 | A2 | 3/2012 |
| WO | 2012/162214 | A1 | 11/2012 |
| WO | 2014/044773 | A2 | 3/2014 |

OTHER PUBLICATIONS

International Search Report and Written Opinion dated Aug. 2, 2017 in PCT/EP2016/079743.
Office Action dated Mar. 29, 2019, issued by the GCC Patent Office, for Application No. GC 2016-32527.
Ukrainian Office Action dated Jun. 28, 2019 for Ukrainian Patent Application No. 201891122 /31 and English translation thereof.
Chinese Office Action dated Jul. 3, 2019 for Chinese Application No. 201680071555.2, with English Translation.
Chinese Office Action Issued in Chinese Patent Application No. 201680071555.2 dated Feb. 26, 2020 (w/ English Translation).
Brazilian Preliminary Office Action issued in Brazilian Patent Application No. BR112018010561-9 dated Aug. 11, 2020 (w/ English translation).
Egyptian Office Action issued in Egyptian Patent Application No. 2018060914 (w/ English Translation).
Chinese Office Action issued in Chinese Patent Application No. 201680071555.2 dated Sep. 10, 2020 (w/ English Translation).
Japanese Office Action issued in Japanese Patent Application No. 2018-530008 dated Aug. 25, 2020 (w/ English Translation).
Office Action dated Jan. 12. 2021 in corresponding Egyptian Patent Application No. 2018060914 (with English Translation), 6 pages.
Combined Argentinian Office Action and Search Report dated Aug. 20, 2020 in Argentinian Patent Application No. 20160103775 (with English translation of Categories of Cited Documents), 6 pages.

* cited by examiner

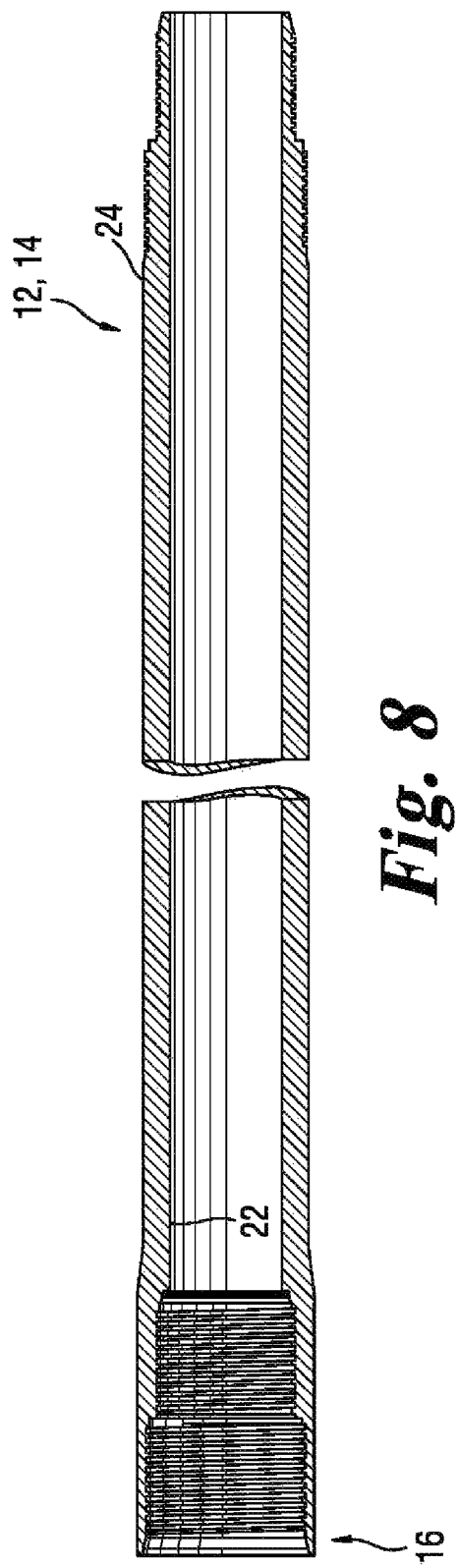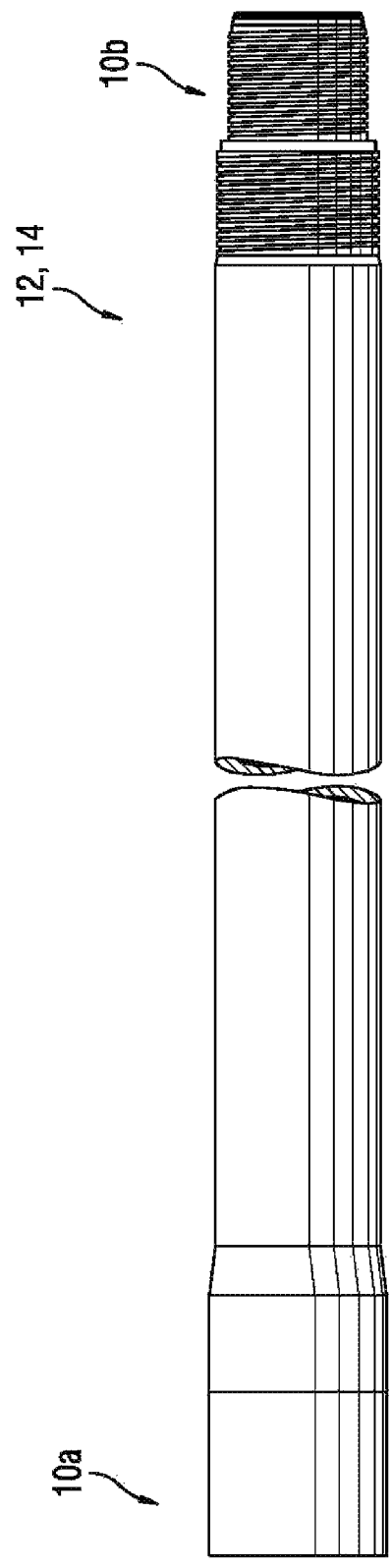

THREADED CONNECTION INCLUDING AN INTERMEDIATE SHOULDER

BACKGROUND OF THE INVENTION

Field of the Invention

The present disclosure relates to apparatus and methods for connecting tubular components, and more particularly, metallic tubular components connected by way of a threaded male portion and a threaded female portion that are formed on longitudinal ends of the tubular components.

Description of the Related Art

Certain types of threaded tubular connections are primarily used to connect tubular components that form casing strings, tubing strings, or drill pipe strings to locate or transport hydrocarbon as part of oil wells or the like. Threaded tubular connections are used on casing strings for providing borehole stability, and or to provide a smooth borehole to allow passage of smaller casing strings, tubing or tools. Such threaded tubular connections are subjected to a variety of combination of stresses that also fluctuate in intensity. For example, the stress may be one or a combination of axial tension or axial compression or internal pressure, or external fluid pressure, bending force, torsional force, etc. Tubular connections are designed to withstand rupture and also provide tight liquid-sealing or gas-sealing despite the combination of stresses and difficult operating conditions. The stresses may change in nature as the pipes are lowered into the well or during operation. For example, tensile stresses may temporarily change to compressive stresses.

There exists a variety of hydrocarbon carrying tubes that yield satisfactory results in terms of mechanical characteristics and tightness. Some involve the use of tubular elements each having one male threaded end and one female threaded end, making for a thin assembly. These assemblies are generally called integral assemblies or connections, in contrast with assemblies or T&C connections employing a coupling or sleeve.

Such integral assemblies are generally made on tubes whose diameter at the end corresponding to the female threading is expanded and whose diameter at the end corresponding to the male threading is reduced. This may be done in order to have sufficient material in the thickness of the tubes to ensure the geometric and mechanical strength of the assembly that joins the tubes.

SUMMARY OF THE INVENTION

In one aspect, a threaded tubular connection comprises a first tubular component and a second tubular component. The first tubular component includes a female portion defined on an interior surface of the first tubular component. The female portion includes an inner threaded portion and an outer threaded portion which are offset radially with respect to a longitudinal axis of the first tubular component by a first shoulder. The second tubular component includes a male portion defined on an exterior surface of the second tubular component. The male portion is to be inserted into the female portion. The male portion includes an inner threaded portion and an outer threaded portion which are offset radially with respect to a longitudinal axis of the second tubular component by a second shoulder. The second shoulder is to abut the first shoulder once the male portion is connected to the female portion. The inner threaded portion and the outer threaded portion of the female portion and the inner threaded portion and the outer threaded portion of the male portion are tapered at approximately 6% or less. The inner threaded portion and the outer threaded portion of the female portion and the inner threaded portion and the outer threaded portion of the male portion include teeth with a crest surface and a root surface. The crest surface and the root surface are flat and parallel to the longitudinal axis of the respective tubular component.

In another aspect, a threaded tubular connection comprises a first tubular component and a second tubular component. The first tubular component includes a female portion defined on an interior surface of the first tubular component. The female portion includes an inner threaded portion and an outer threaded portion which are offset radially with respect to a longitudinal axis of the first tubular component by a first shoulder. The second tubular component includes a male portion defined on an exterior surface of the second tubular component. The male portion is to be inserted into the female portion. The male portion includes an inner threaded portion and an outer threaded portion which are offset radially with respect to a longitudinal axis of the second tubular component by a second shoulder. The second shoulder is to abut the first shoulder once the male portion is connected to the female portion. When the second shoulder abuts the first shoulder, a mated shoulder contact area is defined, the mated shoulder contact area being identical in the first shoulder and the second shoulder. A ratio of the mated shoulder contact area to an area of a nominal cross-section of the first tubular component is more than 15% and less than 25%, and a ratio of the mated shoulder contact area to an area of a nominal cross-section of the second tubular component is more than 15% and less than 25%.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a side view of an example embodiment of a tubular component including the first end and the second end; and FIG. 8 is a side, cross-sectional view of the tubular component in FIG. 7 cut along a longitudinal axis of the tubular component.

DETAILED DESCRIPTION OF THE PREFERRED EMBODIMENTS

Figure 1:
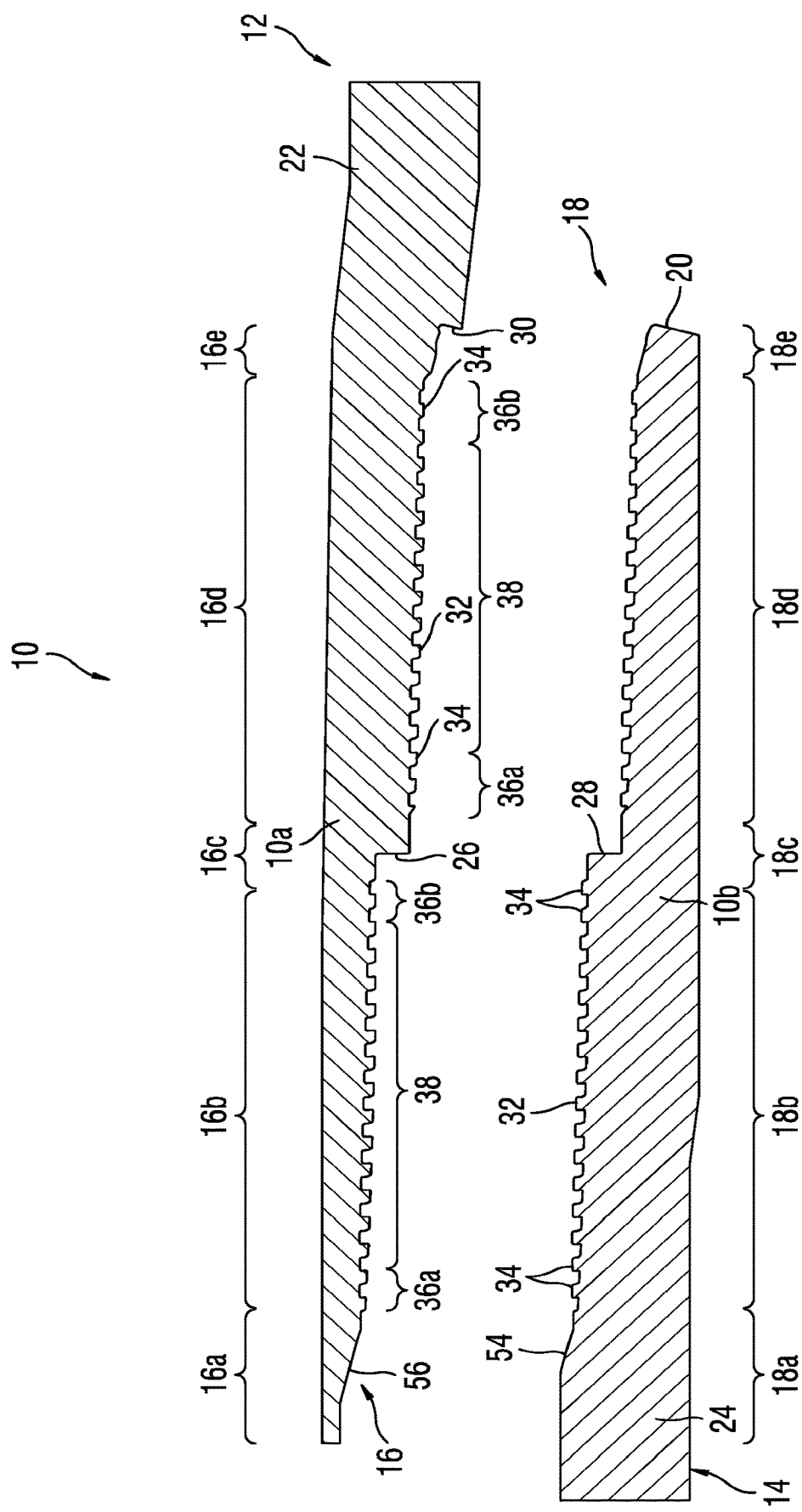
FIG. 1 is a partial cross-sectional view of an example embodiment of one half of a first end of a first tubular component and an example embodiment of one half of a second end of a second tubular component in a disconnected state.

Referring now to the drawings, wherein like reference numerals designate identical or corresponding parts throughout the several views.

Threaded connections disclosed herein relate to tubular components that are connected to form a tubular structure capable of reaching great length. The tubular structure assembled using the tubular components disclosed herein form an internal channel that allows fluid such as oil, gas, water or the like to move therethrough.

Referring to FIG. 1, an example embodiment of a threaded tubular connection 10 between a first tubular component 12 and a second tubular component 14 is illustrated in a disconnected state. The first tubular component 12 and the second tubular component 14 may be identically shaped such that each of the first tubular component 12 and the second tubular component 14 may include the female portion 16 at the first end 10a and the male portion 18 at the second end 10b. FIG. 7 shows an example embodiment of a tubular component in its entirety. The tubular component of FIG. 7 may be either the first tubular component 12 or the second tubular component 14. The first end 10a and the second end 10b may also be referred to as the upstream end and the downstream end in view of the orientations that the tubular components 12, 14 will assume after assembly. The first tubular component 12 may be defined by a first wall 22 while the second tubular component 14 may be defined by a second wall 24. Specifically, FIG. 1 shows a cross-sectional view across an upper half portion of the first end 10a of the first tubular component 12 and a cross-sectional view across an upper half portion of the second end 10b of the second tubular component 14. The entirety of the cross-section of the first end 10a of the first tubular component 12 and the second end 10b of the second tubular component 14 is not shown for clarify of illustration.

Figure 2:
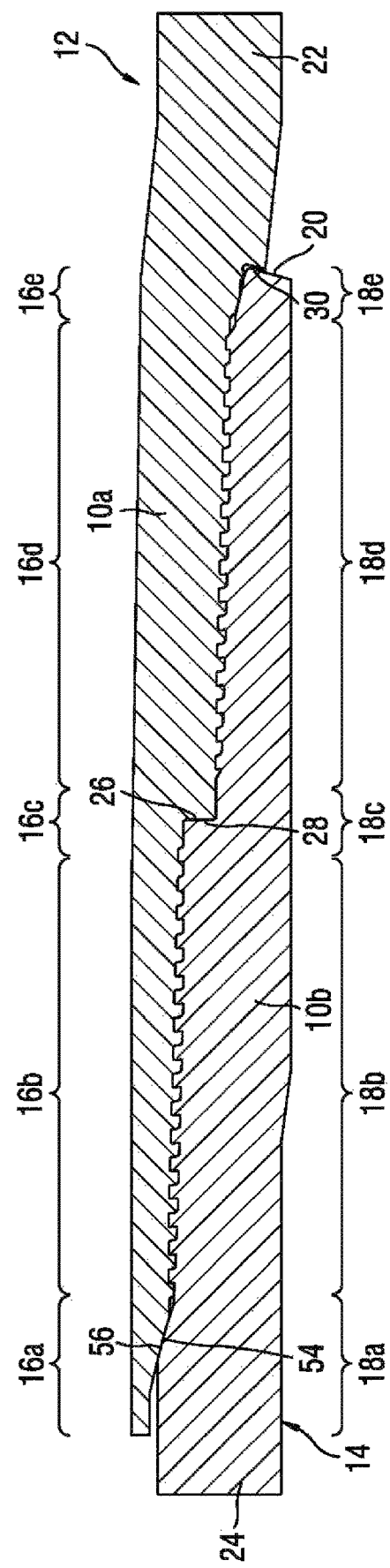
FIG. 2 is a partial cross-sectional view of the one half of the first end of the first tubular component and the one half of the second end of the second tubular component in a connected state.

FIG. 8 shows a cross-sectional view of the tubular component in which the tubular component is cut along a longitudinal axis of the tubular component. The first end 10a of the first tubular component 12 is configured with a female portion 16 of the threaded tubular connection 10 which is also referred to as a box. The female portion 16 is formed on an interior or interior surface of the first wall 22, such that a thickness of the first wall 22 gradually decreases from a nominal wall thickness along the female portion 16 in a leftward direction in FIG. 1. The outer diameter of the first end 10a of the first tubular component 12 may be enlarged along the female portion 16 relative to other longitudinally located portions of the first tubular component 12. The second end 10b of the second tubular component 14 is configured with the male portion 18 of the threaded tubular connection 10 which is also referred to as a pin. The male portion 18 is formed on an exterior or exterior surface of the second wall 24, such that a thickness of the second wall 24 may gradually decrease from a nominal wall thickness along the male portion 18 in a rightward direction in FIG. 1. The first wall 22 and the second wall 24 have the same nominal wall thickness, and the same outer diameter. The inner diameter along the male portion 18 may be the same as other longitudinally located portions of the second tubular component 14. The inner diameter along the male portion 18 may be decreased due to an end sizing process as shown in FIGS. 1 and 2. The male portion 18 is configured to be inserted into and interlock with the female portion 16 as shown in FIG. 2. As such, the length of the male portion 18 and the length of the female portion 16 may be substantially similar.

The female portion 16 may include an outer end portion 16a, an outer threaded portion 16b, a first shoulder portion 16c, an inner threaded portion 16d and an inner end portion 16e. The outer end portion 16a may include a substantially frustoconical opening for entry by the male portion 18. The outer threaded portion 16b and the inner threaded portion 16d in the female portion 16 are configured to interlock by thread engagement with corresponding features in the male portion 18. The outer threaded portion 16b and the inner threaded portion 16d are tapered such that the first wall 22 gradually thickens along the female portion 16 in the rightward direction in FIG. 1. The teeth of the threaded portions will be described later in more detail. The outer threaded portion 16b and the inner threaded portion 16d of the female portion 16 may be offset radially with respect to the longitudinal axis X of the tubular component 12 and transversely with respect to the first wall 22 by the first shoulder portion 16c that may include a first transverse surface 26. While the first transverse surface 26 in FIGS. 1-2 are shown to be radially oriented about the longitudinal axis X of the tubular component 12, the first transverse surface 26 may be embodied in a different orientation.

The male portion 18 may include an inner end portion 18a, an inner threaded portion 18b, a second shoulder portion 18c, an outer threaded portion 18d, and an outer end portion 18e. The inner end portion 18a may be frustoconically shaped to substantially fit within the frustoconical opening of the outer end portion 16a of the female portion 16. The inner threaded portion 18b and the outer threaded portion 18d in the male portion 18 are configured to be accommodated by thread engagement and interlock with respectively the outer threaded portion 16b and the inner threaded portion 16d of the female portion 16. The inner threaded portion 18b and the outer threaded portion 18d in the male portion 18 may be tapered such that the second wall 24 gradually thins along the male portion 18 in the rightward direction in FIG. 1 and as described in more detail with regard to FIG. 4. The outer threaded portion 18d and the inner threaded portion 18b of the male portion 18 may be offset radially with respect to the longitudinal axis of the tubular component 14 and transversely with respect to the second wall 24 by the second shoulder portion 18c. The second shoulder portion 18c may include a second transverse surface 28 that contacts the first transverse surface 26 once the male portion 18 is threadably connected, or mated, with the female portion 16 as shown in FIG. 2. The second transverse surface 28 need not be oriented perpendicularly about the longitudinal axis of the tubular component 14 as long as the second transverse surface 28 is oriented similarly to the first transverse surface 26. The inner end portion 16e of the female portion 16 may be shaped to accommodate the outer end portion 18e of the male portion 18. Specifically, the inner end portion 16e of the female portion 16 and the outer end portion 18e may include a terminal shoulder 30 and a tip 20 respectively as will be described later in more detail. Moreover, the outer diameter of each tubular component 12, 14 may be constant except at the first end 10a and the second end 10b. The outer diameter of each tubular component 12, 14 may be at its largest along the first end 10a and may be at its smallest along the second end 10b. Furthermore, the inner diameter of each of the tubular component 12, 14 may be constant except along the first end 10a and the second end 10b as shown in the connected state of FIG. 2. The inner diameter of the tubular components 12, 14 may be at its largest along the first end 10a and may be at its smallest along the second end 10b.

FIG. 2 illustrates how the female portion 16 of the first end 10a and the male portion 18 of the second end 10b interlock once the male portion 18 is inserted and threaded into the female portion 16 to reach a connected state. The first transverse surface 26 of the female portion 16 and the second transverse surface 28 of the male portion 18 are configured to abut one another in the connected state. Thus, the geometry of the first and second transverse surfaces 26, 28 affects the compressive load capacities of the threaded connection. The transverse surfaces 26, 28 may be annularly shaped. In one embodiment, a mated shoulder contact area of the annular first transverse surface 26 of the first shoulder portion 16c may be more than 15% and less than 25% of an area of a nominal cross-section of the first tubular component 12 while a mated shoulder contact area of the annular second transverse surface 28 of the second shoulder portion 18c may be more than 15% and less than 25% of the area of a nominal cross-section of the second tubular component 14. A nominal cross-section of a tubular component may be defined as a cross-section across the tubular component at a section other than the first end 10a or the second end 10b where the tubular component has a nominal outer diameter and a nominal inner diameter. In another embodiment, the mated shoulder contact area of the annular first transverse surface 26 of the first shoulder portion 16c may be more than 17% and less than 23% of the area of a nominal cross-section of the first tubular component 12 while the mated shoulder contact area of the annular second transverse surface 28 of the second shoulder portion 18c may be more than 17% and less than 23% of the area of a nominal cross-section of the second tubular component 14. The first shoulder portion 16c and the second shoulder portion 18c may help provide support against compressive loads acting in axial directions of the tubular components 12, 14.

Figure 3:
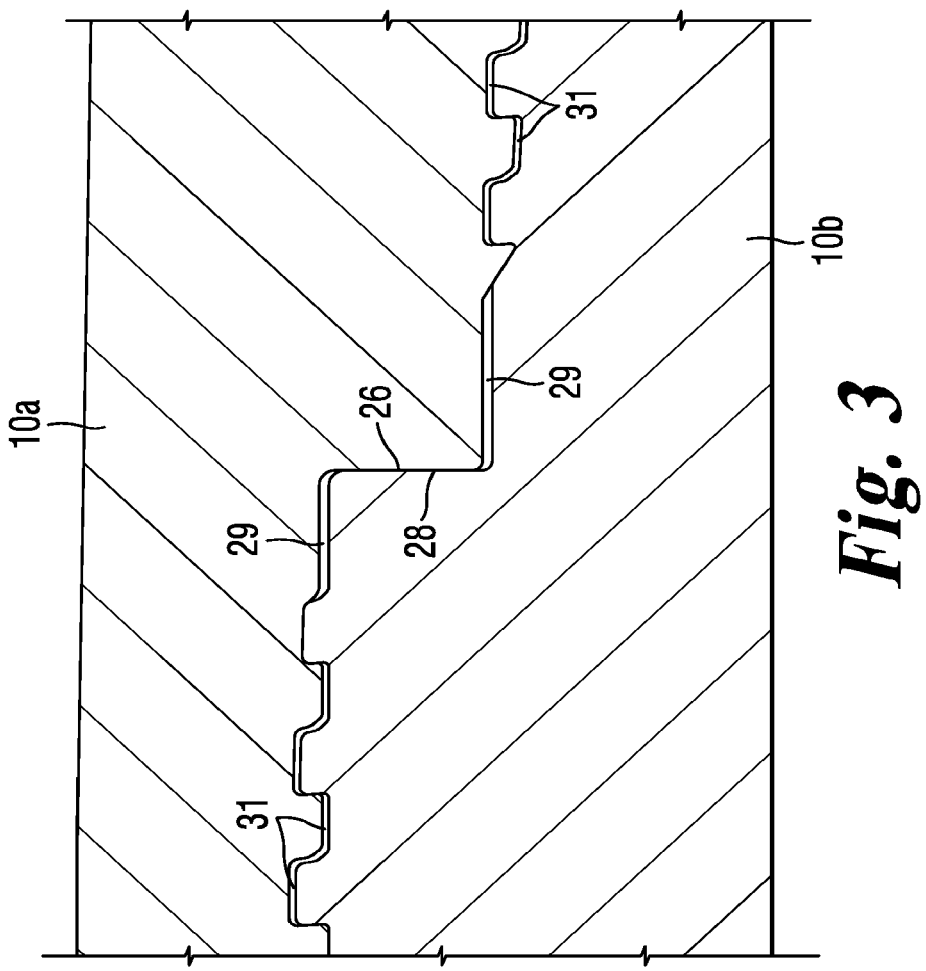
FIG. 3 is a close-up, partial cross-sectional view of a first shoulder portion of the first tubular component and a second shoulder portion of the second tubular component in the connected state.

Moreover, the shapes of the female portion 16 and the male portion 18 are such that gaps are formed between an inner surface of the female portion 16 and an outer surface of the male portion 18 at predetermined regions along the longitudinal axes of the tubular components 12, 14. The gaps may function to facilitate assembly between the female portion 16 and the male portion 18 to ease the make up. For example, as shown in FIG. 3, gaps 29 may be provided adjacent to the first and second shoulder portions 16c, 18c to facilitate assembly of the tubular components 12, 14.

Figure 5:
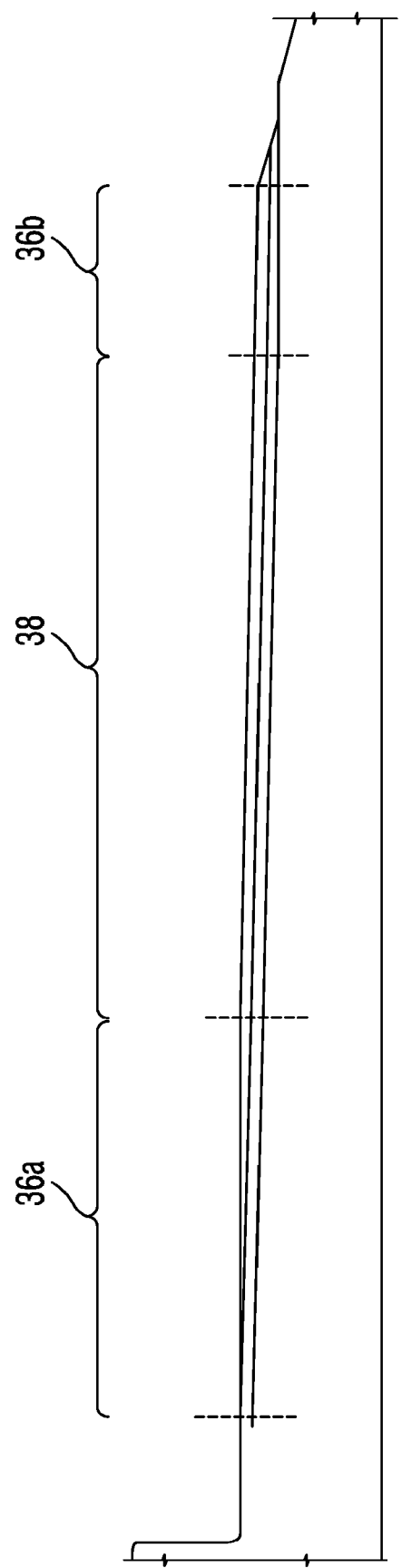
FIG. 5 is a schematic view of the example embodiment of longitudinal end regions and an intermediate region within a given threaded portion.

A threaded portion, whether it is the inner threaded portion 16d or 18b or the outer threaded portion 16b or 18d or whether it is part of the male portion 18 or the female portion 16, may include teeth of varying shapes. As shown in FIGS. 1-2 and 5, a given threaded portion may be divided into two longitudinal end regions 36a, 36b and an intermediate region 38 located between the two longitudinal end regions 36a, 36b. Within a given threaded portion, the teeth 32 may have the same length but may vary in height such that the intermediate region 38 are made up entirely of tall, fully formed teeth 32 while the longitudinal end regions 36a, 36b are made up of shorter teeth 34. The shorter teeth 34 may have the same length but may also vary in height from one another or vary in shape. The shorter teeth 34 may also be a trapezoid. Both of the shorter teeth 34 and the fully formed teeth 32 may be trapezoidal but the shorter teeth 34 may be a differently shaped trapezoid. Moreover, each of the longitudinal end regions 36a, 36b of the threaded portion may include a plurality of shorter teeth 34. Furthermore, the shorter teeth 34 may gradually increase in height as they approach the intermediate region 38 and may gradually decrease in height as they move away from the intermediate region 38.

Figure 4:
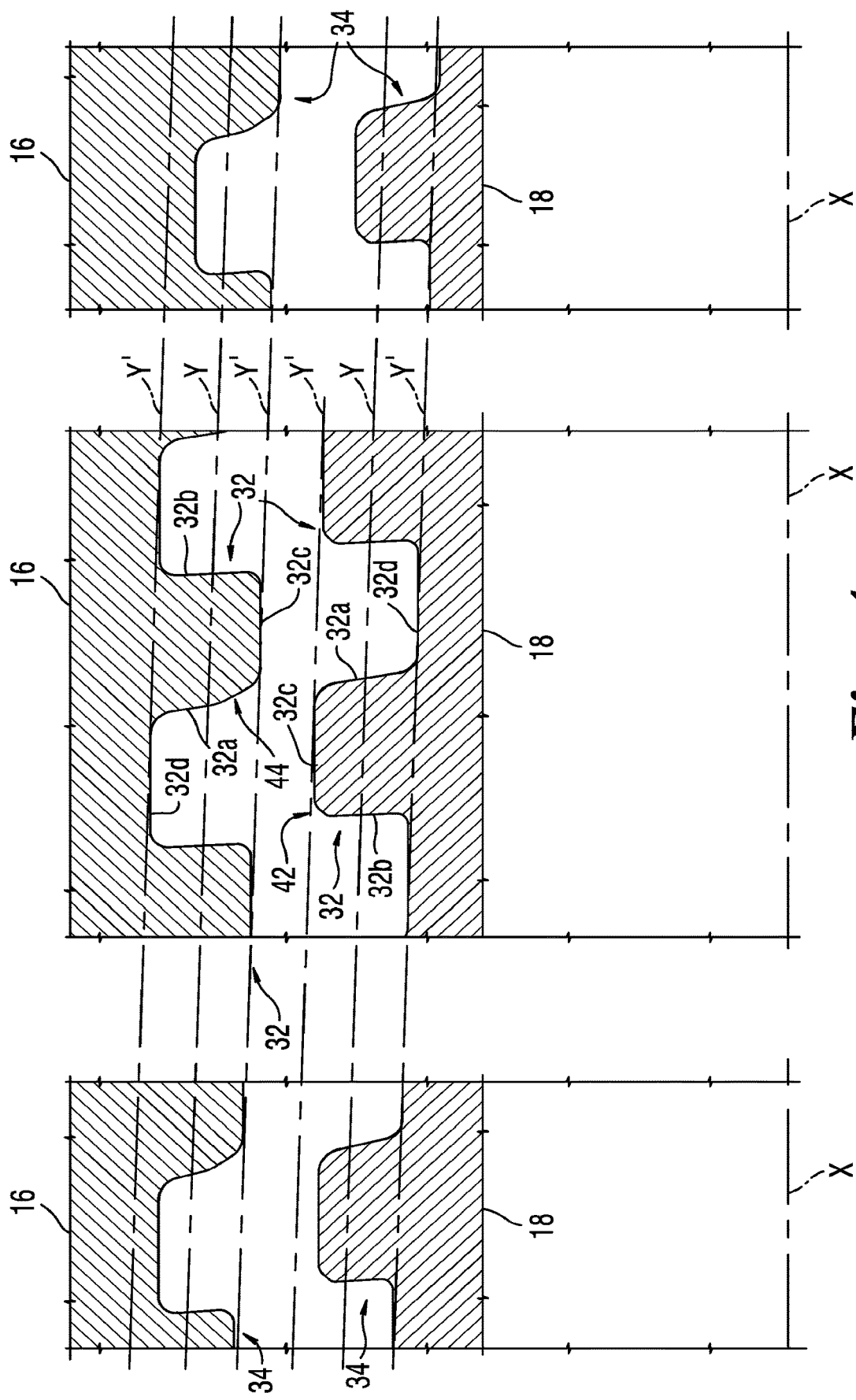
FIG. 4 is a close-up, partial cross-sectional view of an example embodiment of a set of teeth of a threaded portion of the first tubular component and a set of teeth of a threaded portion of the second tubular component in the disconnected state.

FIG. 4 is a close-up view of teeth 32 which may make up part of the outer threaded portion 16b and the inner threaded portion 16d of the female portion 16 or the inner threaded portion 18b and the outer threaded portion 18d of the male portion 18. In FIG. 4, teeth of the female portion 16 and the male portion 18 are shown in a disconnected state.

As shown in FIG. 4, a tooth with a trapezoidal configuration may include a stabbing flank 32a, a loading flank 32b, a crest surface 32c and a root surface 32d. In one embodiment of the fully formed trapezoidal teeth 32, the crest surface 32c and the root surface 32d may be cylindrical such that the crest surface 32c and the root surface 32d are flat and parallel to one another along a cross-section in the longitudinal direction as shown in FIG. 4. The crest surface 32c and the root surface 32d are spaced apart from one another to provide a pocket 31 where grease may stay, such pocket 31 creating a helical path for the grease (FIG. 3). Moreover, the crest surface 32c and the root surface 32d may be parallel to a longitudinal axis X of the tubular component 12, 14. However, the fully formed teeth 32 in the intermediate region 38 may be formed to taper along the intermediate region 38 such that tapering axis Y is at an angle with the longitudinal axis X of the tubular component as shown in FIG. 4.

In one embodiment of the female portion 16, the tapering axis Y may be such that the inner diameter of the female portion 16 along the outer threaded portion 16b and the inner threaded portion 16d decreases approximately by a value ranging from 1 inch for every 16-inch interval in length to 1 inch for every 19-inch interval in length in the rightward direction in FIG. 4. Similarly, in one embodiment of the male portion 18, the tapering axis Y may be such that the outer diameter of the male portion 18 along the inner threaded portion 18b and the outer threaded portion 18d decreases approximately by a value ranging from 1 inch for every 16-inch interval in length to 1 inch for every 19-inch interval in length in the rightward direction in FIG. 4. FIG. 4 further shows axes Y' that are parallel to the tapering axis Y and that are tangential to the crest surfaces 32c and the root surfaces 32d.

In the embodiment of a threaded portion shown schematically in FIG. 5, the fully formed teeth 32 in the intermediate region 38, as well as shorter height teeth 34 of both longitudinal end regions 36a and 36b, may include a crest surface 32c and a root surface 32d that parallel with the longitudinal axis X. As shown in FIG. 5, the longitudinal end regions 36a, 36b may occupy portions of a threaded portion that are different in length such that one longitudinal end region includes a larger number of shorter teeth than the other longitudinal end region. In the connected state, the crest surfaces 32c are spaced apart from the root surfaces 32d in order to allow a pocket 31 shaped as a helical path for the lubricant (FIG. 3).

Furthermore, while the teeth 32 of the male portion 18 and the teeth 32 of the female portion 16 may be correspondingly shaped so as to fit closely with one another, the teeth shape of the male portion 18 and the teeth shape of the female portion 16 may form one or more pockets. For example, in the embodiment of FIG. 4, the corner between the loading flank 32b and the crest surface 32c of the male portion 18 may include a beveled area 42 that provides some space between the tooth 32 of the male portion 18 and the tooth 32 of the female portion 16 in this first region. Also, the corner between the stabbing flank 32a and the root surface 32d may include a beveled area 44 that creates a pocket between the tooth 32 of the male portion 18 and the tooth 32 of the female portion 16 in this second region as shown in FIG. 4. Such a pocket may allow lubricant applied to the female portion 16 and the male portion 18 to be collected therein or may be provided to facilitate the threaded connection between the tubular components 12, 14. Such a pocket also improves both sliding and making up performances of the male portion 18 into the female portion 16.

Figure 6:
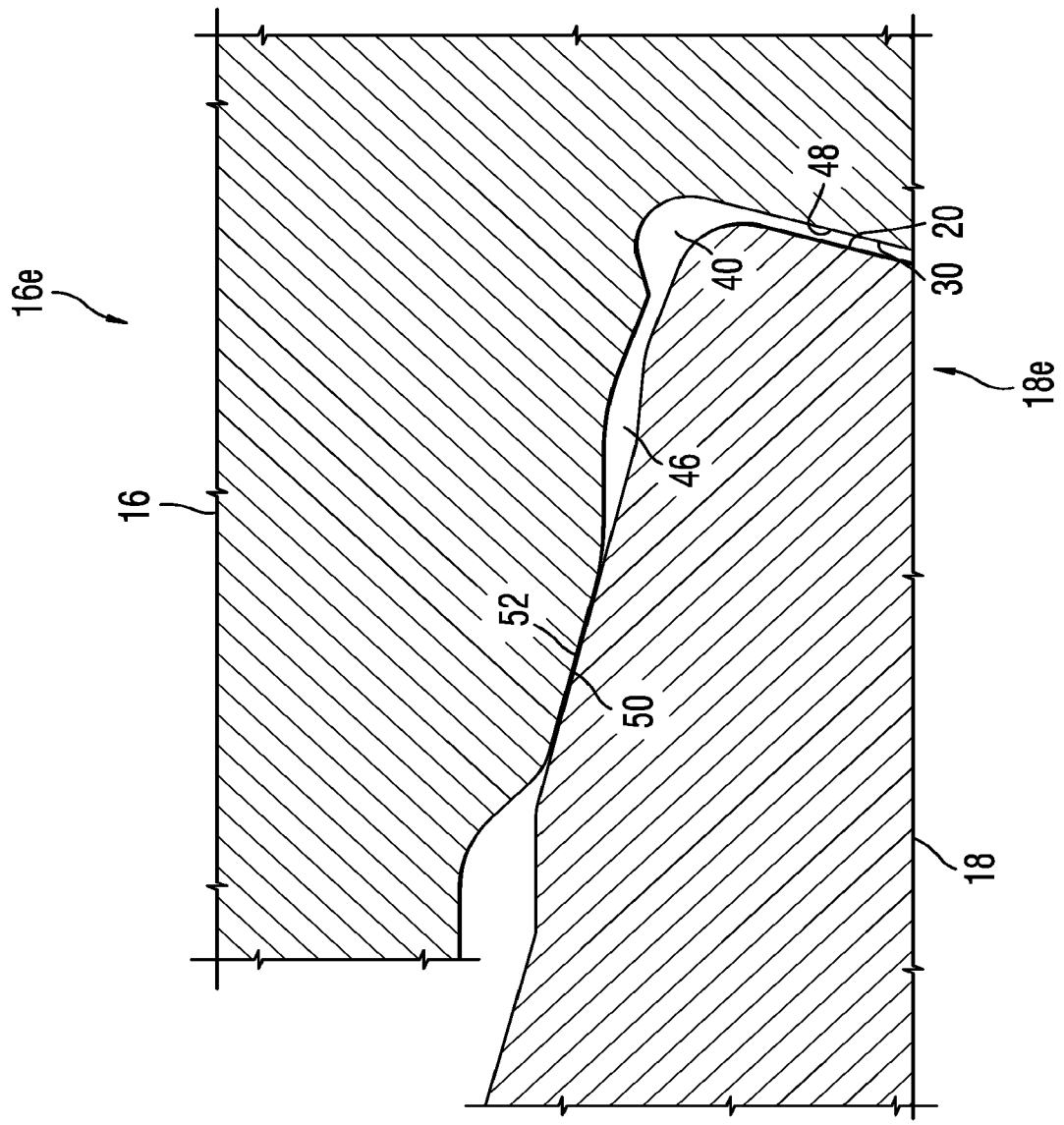
FIG. 6 is a close-up, partial cross-sectional view of an example embodiment of a tip of the male portion and a terminal shoulder of the female portion in the connected state.

Further, as discussed above, the male portion 18 may include the tip 20 at its outer end portion 18e and the inner end portion 16e of the female portion 16 may include the terminal shoulder 30 that is shaped to accommodate the tip 20 of the male portion 18 as shown in FIG. 6. While the inner end portion 16e is configured to accommodate the outer end portion 18e, the inner end portion 16e and the outer end portion 18e may contact each other only in a limited area. In one embodiment, a surface 52 of the inner end portion 16e may be adapted to contact a surface 50 of the outer end portion 18e. One of the surface 50 and the surface 52 may be formed in a domed configuration, having a relatively large radius of curvature, while the other of the surface 50 and the surface 52 may be formed in a conical configuration such that a fluid tight seal may be formed along these surfaces 50, 52. It is also possible for the surface 50 or 52 with a domed configuration to have more than one radii of curvature. The surfaces 50, 52 may include a tapered portion. A terminal shoulder surface 48 of the terminal shoulder 30 may be oriented to be at an angle relative to radial directions of the tubular component 12, 14. However, the tip 20 and the terminal shoulder 30 may be configured to be in a spaced apart relationship such that the outer end portion 18e and the inner end portion 16e only contact at the surfaces 50, 52. Nevertheless, a part of the terminal shoulder 30 may deviate in shape from a shape of the tip 20 such that sizable pockets 40, 46 are formed as shown in FIG. 6. The pocket 46 may be used to collect lubricant or to provide space in order to facilitate assembly.

Further, the outer end portion 16a of the female portion 16 and the inner end portion 18a of the male portion 18 may include a surface 56 and a surface 54 respectively that contact to form a fluid tight seal as shown in FIGS. 1 and 2. One of the surfaces 56, 54 may be formed in a domed configuration while the other of the surfaces 56, 54 may be formed in a conical configuration to accomplish a sealing effect.

In addition, the surface of the female portion 16 and the surface of the male portion 18 may be treated to provide improved sealing between the tubular components 12, 14. For example, metallic coating may be applied to the outer end portion 18e of the male portion 18 and the inner end portion 16e of the female portion that are configured to contact one another. The coating regions of the outer end portion 18e of the male portion 18 and the inner end portion 16e of the female portion may contact one another once the male portion 18 is inserted into the female portion 16 so as to form a seal and such that fluid moving through the inner channel of the tubular components 12, 14 is prevented from leaking through the junction between the female portion 16 and the male portion 18. The same coating may be applied to the entire connection.

The tubular connection discussed herein is configured with dimensions that result in improved performance in terms of axial load resistance. Specifically, the tapering of the threaded portions allows the shoulder portions 16c and 18c to occupy a larger portion of the thickness of the walls 22, 24 of the tubular components 12, 14. If the inner diameters of the tubular components 12, 14 are diminished, the drift diameter defined for all drilling, or other casing, or tubing or tooling accessories would be deteriorated. Also, if the outer diameters of the tubular components 12, 14 are increased, the tubular structure may no longer be suitable for a borehole drilled for the purpose of accommodating the previously used tubular structure or the tubular structure may interfere with other applications in the borehole. However, because the thicknesses of the walls 22, 24 are not increased and the inner and outer diameters of the tubular components 12, 14 are not significantly affected, the improved resistance to axial compressive loads is made possible without diminishing the fluid carrying capacity of the tubular structure and while maintaining compatibility with the borehole as well as other applications used therein.

The present disclosure applies to several sizes of outer diameters ranging from 7" (177.8 mm) to 16" (406.4 mm), even up to 20" (508 mm), and, in other examples, to sizes ranging from 9⅞" (250.8 mm) to 14" (355.6 mm). The pipe may be made out of steel, and, in one example, carbon martensitic stainless steel, with yield strengths ranging from 80 ksi to 140 ksi. The nominal wall thickness of the walls 22, 24 may range between 0.453 inch (11.5 mm) and 0.820 (20.82 mm). The drift diameter may be between 6 inches (152.4 mm) and 14.750 inches (374.65 mm), and in other examples, between 8.5 inches (215.9 mm) and 12.250 inches (311.15 mm).

Obviously, numerous modifications and variations of the present invention are possible in light of the above teachings. It is therefore to be understood that within the scope of the appended claims, the invention may be practiced otherwise than as specifically described herein.

What is claimed is:

1. A threaded tubular connection comprising:
   a first tubular component including a female portion defined on an interior surface of the first tubular component, the female portion including an inner threaded portion and an outer threaded portion which are offset radially with respect to a longitudinal axis of the first tubular component by a first shoulder; and
   a second tubular component including a male portion defined on an exterior surface of the second tubular component, the male portion to be inserted into the female portion, the male portion including an inner threaded portion and an outer threaded portion which are offset radially with respect to a longitudinal axis of the second tubular component by a second shoulder, the second shoulder to abut the first shoulder once the male portion is connected to the female portion,
   wherein the inner threaded portion and the outer threaded portion of the female portion and the inner threaded portion and the outer threaded portion of the male portion are tapered along a tapering axis, at a tapering value ranging from 5.26% to 6%, and
   wherein the first tubular component is defined by a first wall and the second tubular component is defined by a second wall, a ratio of a mated shoulder contact area of the first shoulder to an area of a nominal cross-section of the first tubular component is more than 15% and less than 25%, and a ratio of a mated shoulder contact area of the second shoulder to an area of a nominal cross-section of the second tubular component is more than 15% and less than 25%.

2. The threaded tubular connection according to claim 1, wherein the inner threaded portion and the outer threaded portion of the female portion and the inner threaded portion and the outer threaded portion of the male portion include teeth with a crest surface and a root surface, the crest surface and the root surface being cylindrical, such that the crest surface and the root surface are flat and parallel to the longitudinal axis of the respective tubular component along a cross-section made along the longitudinal axis.

3. The threaded tubular connection according to claim 1, wherein the inner threaded portion and the outer threaded portion of the female portion and the inner threaded portion and the outer threaded portion of the male portion include trapezoidal teeth.

4. The threaded tubular connection according to claim 3, wherein the inner threaded portion and the outer threaded portion of the female portion and the inner threaded portion and the outer threaded portion of the male portion include a plurality of shorter teeth at each longitudinal end.

5. The threaded tubular connection according to claim 3, wherein each of the trapezoidal teeth includes a crest surface and a root surface, both of the crest surface and the root surface being parallel to the longitudinal axis of the tubular component.

6. The threaded tubular connection according to claim 5, wherein each of the trapezoidal teeth includes a stabbing flank and a loading flank.

7. The threaded tubular connection according to claim 6, wherein at least one of the trapezoidal teeth of the male portion is beveled at a corner between the loading flank and the crest surface so as to form a pocket.

8. The threaded tubular connection according to claim 1, wherein an inner end portion of the female portion and an outer end portion of the male portion contact to form a fluid tight seal once the male portion is connected to the female portion.

9. The threaded tubular connection according to claim 8, wherein one of the inner end portion of the female portion and the outer end portion of the male portion includes a domed section, and the other of the inner end portion of the female portion and the outer end portion of the male portion includes a conical section.

10. The threaded tubular connection according to claim 8, wherein the outer end portion of the male portion includes a tip and the inner end portion of the female portion includes a terminal shoulder to accommodate the tip, and the tip and the terminal shoulder are spaced apart downstream of the fluid tight seal.

11. The threaded tubular connection according to claim 1, wherein the male portion and the female portion are shaped to form at least one pocket near a tip of the male portion once the male portion is connected to the female portion.

12. The threaded tubular connection according to claim 1, wherein the outer threaded portion of the male portion and the inner threaded portion of the female portion are shaped to form a pocket shaped as a helical path once the male portion is connected to the female portion.

13. The threaded tubular connection according to claim 1, wherein the nominal cross-section of the first tubular component or the second tubular component is a cross-section across the respective tubular component at a section other than longitudinal ends of the respective tubular component such that a first wall of the first tubular component and a second wall of the second tubular component have the same nominal wall thickness and the same outer diameter, and the first tubular component and the second tubular component have the same nominal cross-section.

\* \* \* \* \*